United States Patent
Kumar K. M. et al.

(10) Patent No.: US 9,811,280 B2
(45) Date of Patent: Nov. 7, 2017

(54) EFFICIENT METHOD OF COMBINING PARITY GROUPS FOR UNIFORM LOAD DISTRIBUTION AND MAXIMIZING PARALLELIZATION IN PARITY DE-CLUSTERED AND SLICED DISK RAID ARCHITECTURE

(71) Applicant: NetApp, Inc., Sunnyvale, CA (US)

(72) Inventors: Bharath Kumar K. M., Sunnyvale, CA (US); Jagadish Vasudeva, Sunnyvale, CA (US); Atul Goel, Sunnyvale, CA (US); Jaldhi Dave, Sunnyvale, CA (US)

(73) Assignee: NETAPP, INC., Sunnyvale, CA (US)

( * ) Notice: Subject to any disclaimer, the term of this patent is extended or adjusted under 35 U.S.C. 154(b) by 0 days.

(21) Appl. No.: 14/757,429

(22) Filed: Dec. 23, 2015

(65) Prior Publication Data
US 2017/0185338 A1  Jun. 29, 2017

(51) Int. Cl.
*G06F 3/06* (2006.01)

(52) U.S. Cl.
CPC .......... *G06F 3/0631* (2013.01); *G06F 3/0604* (2013.01); *G06F 3/0689* (2013.01)

(58) Field of Classification Search
CPC .............................. G06F 3/0689; G06F 3/0631
See application file for complete search history.

(56) References Cited

U.S. PATENT DOCUMENTS

| | | | | |
|---|---|---|---|---|
| 7,752,389 B1 * | 7/2010 | Fan | ...................... | G06F 11/1092 711/114 |
| 7,979,633 B2 * | 7/2011 | Kleiman | ............... | G06F 3/0613 711/114 |
| 8,099,623 B1 * | 1/2012 | Li | ........................ | G06F 11/1084 714/6.22 |
| 2012/0011315 A1 * | 1/2012 | Ishizaki | ................ | G06F 3/0608 711/114 |
| 2012/0030425 A1 * | 2/2012 | Becker-Szendy | ... | G06F 11/1076 711/114 |
| 2012/0278531 A1 * | 11/2012 | Horn | ...................... | G06F 11/108 711/103 |
| 2015/0269022 A1 * | 9/2015 | Taranta, II | .......... | G06F 11/1092 714/766 |

* cited by examiner

*Primary Examiner* — Ryan Bertram
(74) *Attorney, Agent, or Firm* — Nixon Peabody LLP; Anthony M. Duncan, Jr.

(57) ABSTRACT

Presented herein are methods, non-transitory computer readable media, and devices for maximizing parallelization in a parity de-clustered and sliced disk RAID architecture implemented on at least one hard disk drive by creating at least one allocation group, each created allocation group comprising at least one parity group within a sliced disk group, selecting one of said at least one allocation group, and performing at least one of write or read concurrently on all parity groups within the selected allocation group.

18 Claims, 8 Drawing Sheets

FIG. 1

Parity Groups layout in a Sliced Disk Group

Slice #4 on Disk #28 belongs to PG #8

Slice #10 on Disk #26 belongs to PG #21

Sliced Disk Group

| Disk→ | D1 | D2 | D3 | D4 | D5 | D6 | D7 | D8 | D9 | D10 | D11 | D12 | D13 | D14 | D15 | D16 | D17 | D18 | D19 | D20 | D21 | D22 | D23 | D24 | D25 | D26 | D27 | D28 | D29 | D30 | D31 | D32 |
|---|---|---|---|---|---|---|---|---|---|---|---|---|---|---|---|---|---|---|---|---|---|---|---|---|---|---|---|---|---|---|---|---|
| S1 | 1 | 1 | 1 | 1 | 1 | 1 | 1 | 1 | 1 | 1 | 1 | 1 | 1 | 1 | 2 | 2 | 2 | 2 | 2 | 2 | 2 | 2 | 2 | 2 | 2 | 2 | 2 | 2 | 3 | 3 | 3 | 3 |
| S2 | 3 | 3 | 3 | 3 | 3 | 4 | 4 | 4 | 4 | 4 | 5 | 5 | 5 | 5 | 3 | 3 | 3 | 3 | 3 | 4 | 4 | 4 | 4 | 4 | 5 | 5 | 5 | 5 | 4 | 4 | 4 | 4 |
| S3 | 5 | 6 | 6 | 6 | 7 | 6 | 6 | 7 | 7 | 7 | 6 | 6 | 7 | 7 | 6 | 6 | 7 | 7 | 7 | 5 | 6 | 6 | 6 | 7 | 6 | 6 | 7 | 7 | 5 | 5 | 5 | 5 |
| S4 | 8 | 7 | 8 | 8 | 8 | 8 | 8 | 9 | 9 | 9 | 8 | 9 | 9 | 9 | 9 | 9 | 8 | 9 | 9 | 8 | 7 | 8 | 9 | 8 | 9 | 10 | 8 | 8 | 8 | 9 | 9 | 10 |
| S5 | 10 | 10 | 11 | 12 | 10 | 10 | 11 | 10 | 10 | 11 | 11 | 11 | 10 | 11 | 10 | 10 | 11 | 11 | 11 | 10 | 12 | 11 | 10 | 11 | 12 | 11 | 10 | 12 | 12 | 11 | 12 | 11 |
| S6 | 12 | 13 | 12 | 13 | 13 | 14 | 14 | 12 | 12 | 12 | 14 | 13 | 13 | 13 | 12 | 13 | 12 | 13 | 14 | 13 | 13 | 13 | 14 | 13 | 14 | 12 | 14 | 14 | 13 | 14 | 13 | 14 |
| S7 | 15 | 14 | 16 | 14 | 16 | 15 | 15 | 15 | 16 | 16 | 15 | 16 | 15 | 14 | 16 | 15 | 17 | 15 | 15 | 16 | 14 | 16 | 16 | 15 | 15 | 15 | 16 | 16 | 15 | 16 | 15 | 17 |
| S8 | 17 | 18 | 17 | 19 | 18 | 17 | 18 | 17 | 18 | 18 | 18 | 17 | 17 | 18 | 18 | 17 | 18 | 17 | 16 | 18 | 17 | 17 | 19 | 18 | 18 | 19 | 19 | 17 | 16 | 17 | 18 | 18 |
| S9 | 19 | 19 | 20 | 20 | 20 | 19 | 20 | 20 | 21 | 19 | 21 | 19 | 19 | 20 | 20 | 21 | 19 | 20 | 21 | 21 | 17 | 21 | 20 | 19 | 21 | 20 | 20 | 21 | 20 | 19 | 19 | 20 |
| S10 | 22 | 21 | 22 | 20 | 21 | 22 | 23 | 21 | 22 | 23 | 22 | 23 | 23 | 22 | 22 | 23 | 23 | 22 | 22 | 22 | 22 | 21 | 23 | 23 | 23 | 21 | 22 | 23 | 23 | 21 | 22 | 23 |
| S11 | 24 | 24 | 25 | 25 | 24 | 24 | 26 | 24 | 25 | 25 | 25 | 24 | 25 | 24 | 23 | 26 | 24 | 25 | 24 | 25 | 25 | 24 | 24 | 25 | 24 | 25 | 23 | 26 | 24 | 25 | 26 | 24 |
| S12 | 26 | 26 | 26 | 27 | 27 | 27 | 27 | 28 | 26 | 28 | 28 | 27 | 27 | 26 | 27 | 28 | 27 | 26 | 27 | 27 | 27 | 26 | 26 | 26 | 25 | 26 | 28 | 26 | 28 | 28 | 27 | 25 |
| S13 | 29 | 28 | 28 | 29 | 30 | 30 | 29 | 28 | 29 | 29 | 29 | 30 | 29 | 28 | 29 | 29 | 28 | 30 | 29 | 28 | 28 | 29 | 28 | 31 | 30 | 30 | 29 | 30 | 29 | 30 | 30 | 29 |
| S14 | 31 | 31 | 30 | 32 | 31 | 32 | 30 | 31 | 32 | 30 | 31 | 31 | 32 | 32 | 31 | 30 | 32 | 31 | 32 | 33 | 31 | 32 | 31 | 32 | 32 | 32 | 30 | 31 | 31 | 31 | 33 | 33 |
| S15 | 33 | 33 | 34 | 33 | 34 | 34 | 33 | 35 | 35 | 33 | 34 | 33 | 34 | 34 | 32 | 34 | 35 | 33 | 33 | 34 | 33 | 35 | 34 | 34 | 33 | 35 | 33 | 34 | 32 | 32 | 34 | 34 |

Slice offset, PG ID

EFFICIENT METHOD OF COMBINING PARITY GROUPS FOR UNIFORM LOAD DISTRIBUTION AND MAXIMIZING PARALLELIZATION IN PARITY DE-CLUSTERED AND SLICED DISK RAID ARCHITECTURE

BACKGROUND

Technical Field

The present disclosure relates generally to parallelization in parity de-clustered and sliced disk Redundant Array of Independent Disks (RAID) architecture. More particularly, aspects of this disclosure relate to methods, non-transitory computer readable media, and devices for combining parity groups for uniform load distribution and maximizing parallelization in parity de-clustered and sliced disk RAID architecture.

Description of Related Art

In traditional RAID architecture, the RAID group generally provides (a) fault tolerance against disk failures, ensures that (b) full stripe writes and reads (which involve all disks) utilize all disk spindles and spread the load uniformly in that RAID group.

A parity drive is a hard drive used in RAID technology to provide fault tolerance. Parity is a calculated value which is used for reconstruction of data after a failure. Conventionally, while data is being written to a RAID volume, a calculation for parity is performed by conducting an exclusive OR (XOR) procedure on the data. The calculated parity is then written to the volume. If a portion of the RAID volume fails, the data on the failed portion can be recreated using the parity information and the remainder of the data. In parity de-clustered and sliced disk (PDSD) RAID architecture, however, the above two goals ((a) and (b)) cannot be encompassed within a single entity.

First, fault tolerance is provided by a parity group (PG) which is made up of slices chosen from a subset of disks within the sliced disk group (SDG), a SDG being a collection of disks with similar physical properties. Parity groups may share disks with other parity groups, and thus, cannot become independent and completely parallel entities for inputs and outputs (IOs).

Second, the goal of utilizing all available disk spindles in the system and spreading the load uniformly across the disks can be achieved through the sliced disk group, since it is an independent (does not share the disks with other sliced disk groups) and parallel entity for IOs, provided that uniform use and loading of all the disk spindles within the SDG are insured.

In PDSD RAID architecture, each disk is divided into thousands of slices. Disks with similar properties (like RPM, size, checksum-style, media-type, operating protocol) are grouped to form a SDG. The number of disks in a sliced disk group is typically two to five times the number of disks in a traditional RAID group, achieving better reconstruction throughput. Parity groups are created from slices chosen from a subset of disks within the SDG and their layout is governed by parity de-clustering algorithm. A parity group will not span all disks in a sliced disk group, so IOs across multiple parity groups are required to utilize all disk spindles of the SDG. At any instance, overall disk utilization and load per disk within the sliced disk group depends on the subset of parity groups servicing the IOs. Random selection of parity groups in practice causes uneven disk utilization or uneven load distribution and also does not guarantee spanning all disks of a sliced disk group as disks are shared with multiple parity groups.

Thus, there is a need for a method and an apparatus for combining multiple parity groups under a sliced disk group to achieve uniform use and loading of all the disk spindles within the SDG.

SUMMARY

According to an aspect of an exemplary embodiment, a method of maximizing parallelization in a parity de-clustered and sliced disk RAID architecture implemented on at least one hard disk drive, using at least one processor, includes creating, using at least one of said at least one processor, at least one allocation group, each created allocation group comprising at least one parity group within a sliced disk group, selecting, using at least one of said at least one processor, one of said at least one allocation group, and performing, using at least one of said at least one processor, at least one of write or read concurrently on all parity groups within the selected allocation group, where each of the at least one parity group comprises slices chosen from a subset of disks within the sliced disk group.

According to another exemplary embodiment, the sliced disk group comprises disks from the at least one hard disk drive incorporating similar properties, the similar properties comprises at least one of RPM, size, checksum-style, media-type and operating protocol, and the selecting further includes selecting the one of said at least one allocation group based on similarity of the physical properties of the at least one parity group.

According to another exemplary embodiment, the selecting further comprises selecting the one of said at least one allocation group based on the available space in the sliced disk group.

According to another exemplary embodiment, the creating further includes determining, using at least one of said at least one processor, if size of the sliced disk group is an integral multiple of size of the parity group, deriving, using at least one of said at least one processor, "SDG_rows_per_AG" value based on the determination, and associating, using at least one of said at least one processor, each of the at least one allocation group for all parity groups in the sliced disk group based on the derived "SDG_rows_per_AG" value.

According to another exemplary embodiment, if the determination is positive, the "SDG_rows_per_AG" value is set to 1.

According to another exemplary embodiment, if the determination is negative, the "SDG_rows_per_AG" value is set using the formula: SDG_rows_per_AG=LCM (SDG-size % PG-width, PG_width)/(SDG-size % PG-width).

According to another aspect of an exemplary embodiment, a non-transitory machine-readable medium having stored thereon instructions for performing a method comprising machine executable code which when executed by at least one processor, causes the processor to create at least one allocation group, each created allocation group comprising at least one parity group within a sliced disk group, select one of said at least one allocation group, and perform at least one of write or read concurrently on all parity groups within the selected allocation group, where each of the at least one parity group comprises slices chosen from a subset of disks within the sliced disk group.

According to another exemplary embodiment, the machine executable code further causes the machine to select the one of said at least one allocation group based on similarity of the physical properties of the at least one parity group, where the sliced disk group comprises disks from at least one hard disk drive incorporating similar properties, and the similar properties comprises at least one of RPM, size, checksum-style, media-type and operating protocol.

According to another exemplary embodiment, the machine executable code further causes the machine to select the one of said at least one allocation group based on the available space in the sliced disk group.

According to another exemplary embodiment, the machine executable code causes the machine to create the at least one allocation group by further causing the machine to determine if size of the sliced disk group is an integral multiple of size of the parity group, derive "SDG_rows_per_AG" value based on the determination, and associate each of the at least one allocation group for all parity groups in the sliced disk group based on the derived "SDG_rows_per_AG" value.

According to another exemplary embodiment, if the determination is positive, the "SDG_rows_per_AG" value is set to 1.

According to another exemplary embodiment, if the determination is negative, the "SDG_rows_per_AG" value is set using the formula: SDG_rows_per_AG=LCM (SDG-size % PG-width, PG_width)/(SDG-size % PG-width).

According to another aspect of an exemplary embodiment, a computing device includes a memory comprising machine executable code for performing a method of maximizing parallelization in a parity de-clustered and sliced disk RAID architecture implemented on the at least one hard disk drive, a processor coupled to the memory, the processor configured to execute the machine executable code to cause the processor to execute the machine executable code to cause the processor to create at least one allocation group, each created allocation group comprising at least one parity group within a sliced disk group, select one of said at least one allocation group, and perform at least one of write or read concurrently on all parity groups within the selected allocation group, where the sliced disk group comprises disks from the at least one hard disk drive incorporating similar properties, and each of the at least one parity group comprises slices chosen from a subset of disks within the sliced disk group.

According to another exemplary embodiment, the machine executable code further causes the processor to select the one of said at least one allocation group based on similarity of the physical properties of the at least one parity group, where the sliced disk group comprises disks from at least one hard disk drive incorporating similar properties, and the similar properties comprises at least one of RPM, size, checksum-style, media-type and operating protocol.

According to another exemplary embodiment, the machine executable code further causes the processor to select the one of said at least one allocation group based on the available space in the sliced disk group.

According to another exemplary embodiment, the machine executable code causes the processor to create the at least one allocation group by further causing the processor to determine if size of the sliced disk group is an integral multiple of size of the parity group, derive "SDG_rows_per_AG" value based on the determination, and associate each of the at least one allocation group for all parity groups in the sliced disk group based on the derived "SDG_rows_per_AG" value.

According to another exemplary embodiment, if the determination is positive, the "SDG_rows_per_AG" value is set to 1.

According to another exemplary embodiment, if the determination is negative, the "SDG_rows_per_AG" value is set using the formula: SDG_rows_per_AG=LCM (SDG-size % PG-width, PG_width)/(SDG-size % PG-width).

The present disclosure is susceptible to various modifications and alternative forms, and some representative embodiments have been shown by way of example in the drawings and will be described in detail herein. It should be understood, however, that the inventive aspects are not limited to the particular forms illustrated in the drawings. Rather, the disclosure is to cover all modifications, equivalents, and alternatives falling within the spirit and scope of the disclosure as defined by the appended claims.

DETAILED DESCRIPTION OF THE DRAWINGS

The present disclosure is directed to methods, non-transitory computer readable media, and devices for combining parity groups for uniform load distribution and maximizing parallelization in parity de-clustered and sliced disk RAID architecture.

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

It will be understood to those skilled in the art that the disclosure described herein may apply to any type of special-purpose (e.g., file server, filer or storage serving appliance) or general-purpose computer, including a standalone computer or portion thereof (i.e. a workload), embodied as or including a storage system. Moreover, the teachings of this disclosure can be adapted to a variety of storage system architectures including, but not limited to, a network-attached storage environment, a storage area network, a disk assembly directly-attached to a client or host computer and, illustratively, a cluster of interconnected storage system nodes. The term "storage system" should therefore be taken broadly to include such arrangements in addition to any subsystems configured to perform a storage function and associated with other equipment or systems. Furthermore, flash disk arrays are also contemplated as a form of storage to which the concepts described below apply.

Figure 1:
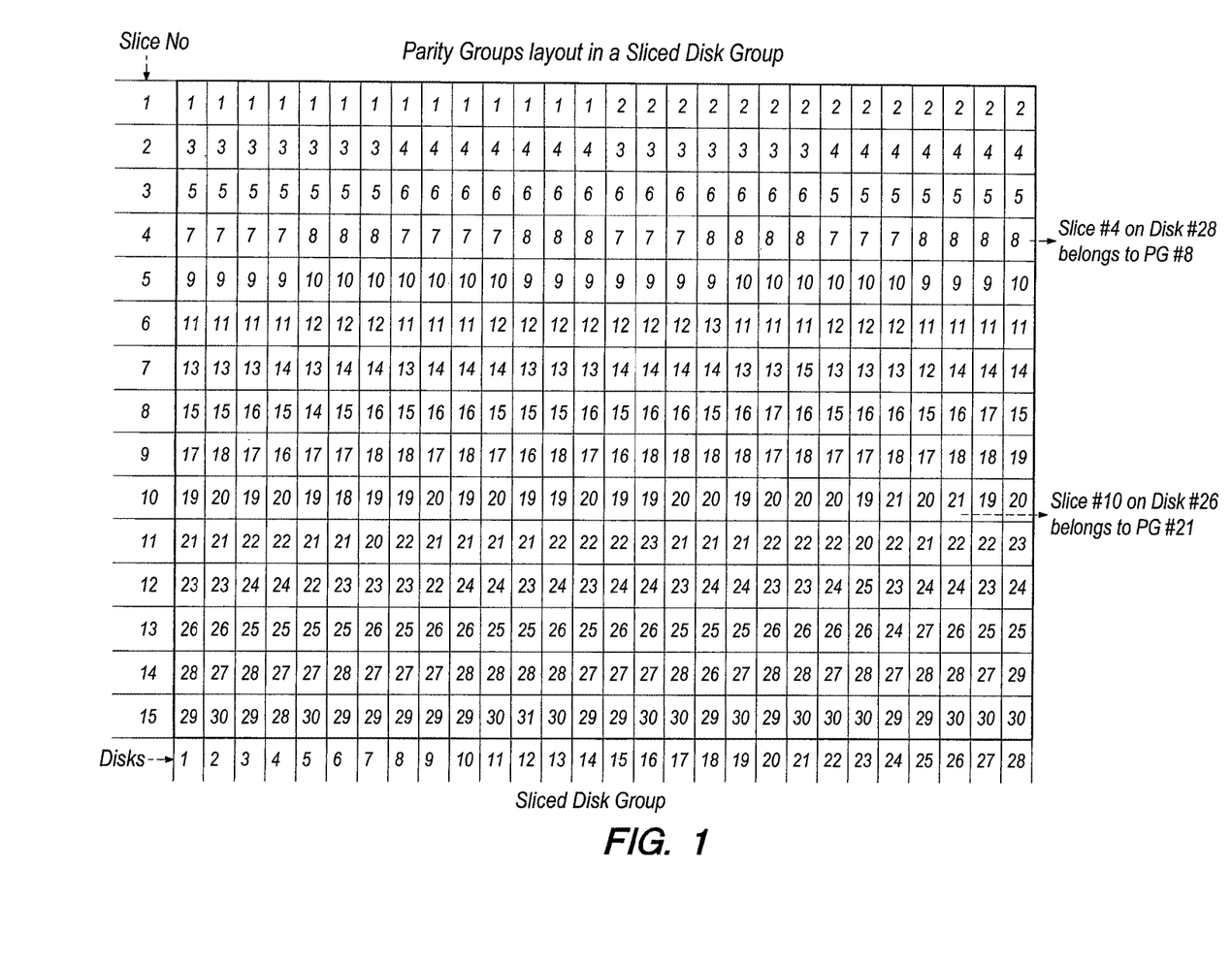
FIG. 1 depicts a parity group layout in a sliced disk group, according to an exemplary embodiment.

Referring now to the drawings, wherein like reference numerals refer to like features throughout the several views, there is shown in FIG. 1, a parity group layout in a sliced disk group.

FIG. 1 is a schematic representation of a collection of RAID disks in which each column represents a disk, and each row represents a slice across one or more disks. The numbers in the individual cells represent the parity group to which a particular slice of a disk belongs.

Representing the above discussed problem using the non-limiting exemplary embodiment depicted in FIG. 1, choosing parity group 1 (PG1, covering disks from columns 1-14) and parity group 3 (PG3, covering disks from columns 1-7 and columns 15-21) for a write operation results in leaving disks from columns 22 to 28 unutilized in the write operation. Moreover, disks from column 1 to 7 receive double the load, as both PG 1 and PG3 cover disks from columns 1 to 7, compared to the rest of the utilized disks which are covered by only one parity group, in turn making disks from column 1 to 7 a bottleneck for the completion of the write operation.

A solution to the above described problem can be achieved using a logical entity called an allocation group (AG), which is a collection of parity groups within a sliced disk group, where the sliced disk group is a collection of disks from a hard disk drive incorporating similar properties and a parity group is a collection of slices chosen from a subset of disks within the sliced disk group.

A write or read operation performed concurrently on all parity groups within an allocation group ensures maximum parallelization and even load distribution on all disks within the sliced disk group. Additionally, an AG aids in targeting concurrent IOs to the parity groups which have similar physical properties (e.g. their disk blocks are from the same disk diameter zone).

Figure 2:
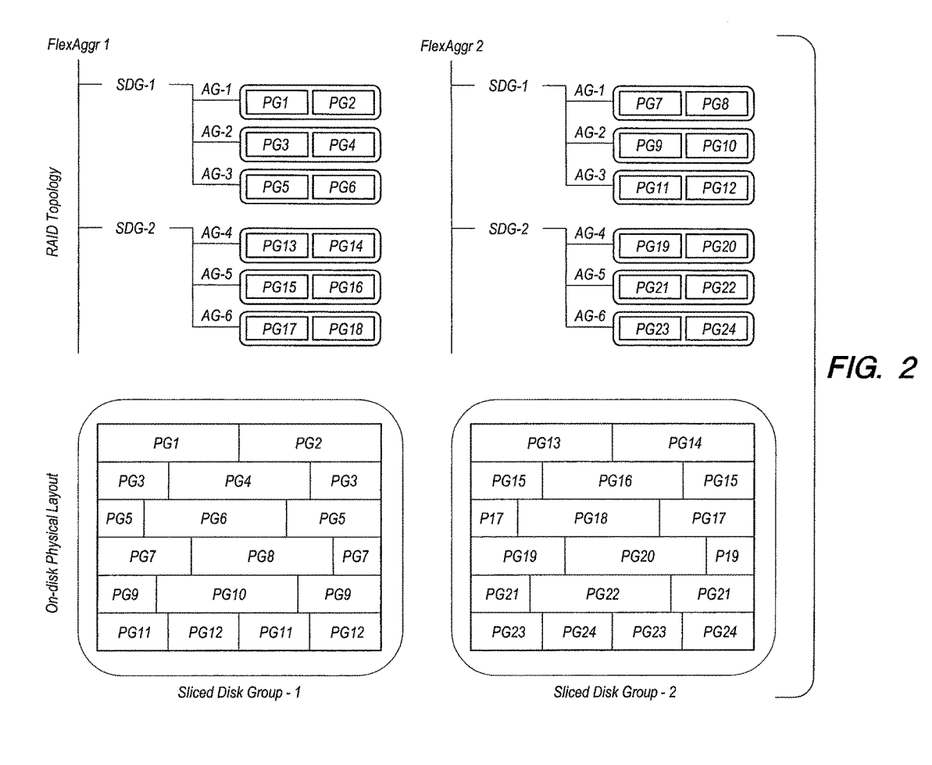
FIG. 2 depicts organization of flexible aggregate, according to an exemplary embodiment.

FIG. 2 depicts organization of a flexible aggregate, a flexible aggregate being a logical container of data blocks which is further accessed by the file system.

In PDSD RAID architecture which implements the above described allocation groups, allocation group objects are placed under a sliced disk group and act as containers for parity groups. A flexible aggregate may be provisioned by choosing allocation groups from multiple sliced disk groups.

As depicted in FIG. 2, allocation group 1 under flexible aggregate 1 includes PG 1 and PG2, which is placed under SDG1, according to an exemplary embodiment. Furthermore, flexible aggregate 1 comprises allocation groups spanning parity groups 1-6 and 13-18, placed under SDG1 and SDG2, according to the depicted exemplary embodiment. Similarly, flexible aggregate 2 comprises allocation groups which in-turn comprise parity groups 7-12 and 19-24 placed under SDG1 and SDG2, according to the depicted exemplary embodiment.

FIG. 2 further depicts the on-disk physical layout of SDG1 and SDG2 incorporating PG1-12 and PG13-24 respectively.

Different types of flexible aggregate IOs can span across all the disk spindles and load the disks uniformly using the allocation group in the following ways.

During the issuance of a write command, it is advantageous to choose a disk block such that a high write throughput and a good read throughput on subsequent reads is ensured. Using the RAID topology, an exemplary embodiment of which is depicted in FIG. 2, a write allocator, which allocates writes among different parity groups, can choose the best allocation group, at the moment when the write command is issued, from each SDG of a flexible aggregate, based on certain parameters such as the number of free blocks in an allocation group. The write allocator can then allocate writes to all parity groups in the selected allocation group. Using such an allocation, write performance is more predictable and efficient since there is utilization of all disk spindles and the load is spread uniformly across all disks in sliced disk group. The above described concept of loading the disks uniformly using allocation groups will now be described using the exemplary embodiment of FIG. 2.

Based on the embodiment of FIG. 2, let us assume that upon receiving a write command, the write allocator determines that AG3 under flexible aggregate 1 is the best candidate based on the number of free blocks available. Based on this determination, the write allocator allocates writes to all parity groups in the determined AG3, i.e. PG5 and PG6. Looking at FIG. 1, we notice that PG5 encompasses disks from column 1-7 and 22-28 whereas PG6 encompasses disks from column 8-21. Thus, using the above allocation technique, all disks from column 1-28 are utilized thereby allowing a uniform spread of load across all disks in sliced disk group and in turn leading to a write performance which is more predictable and efficient.

Figure 3:
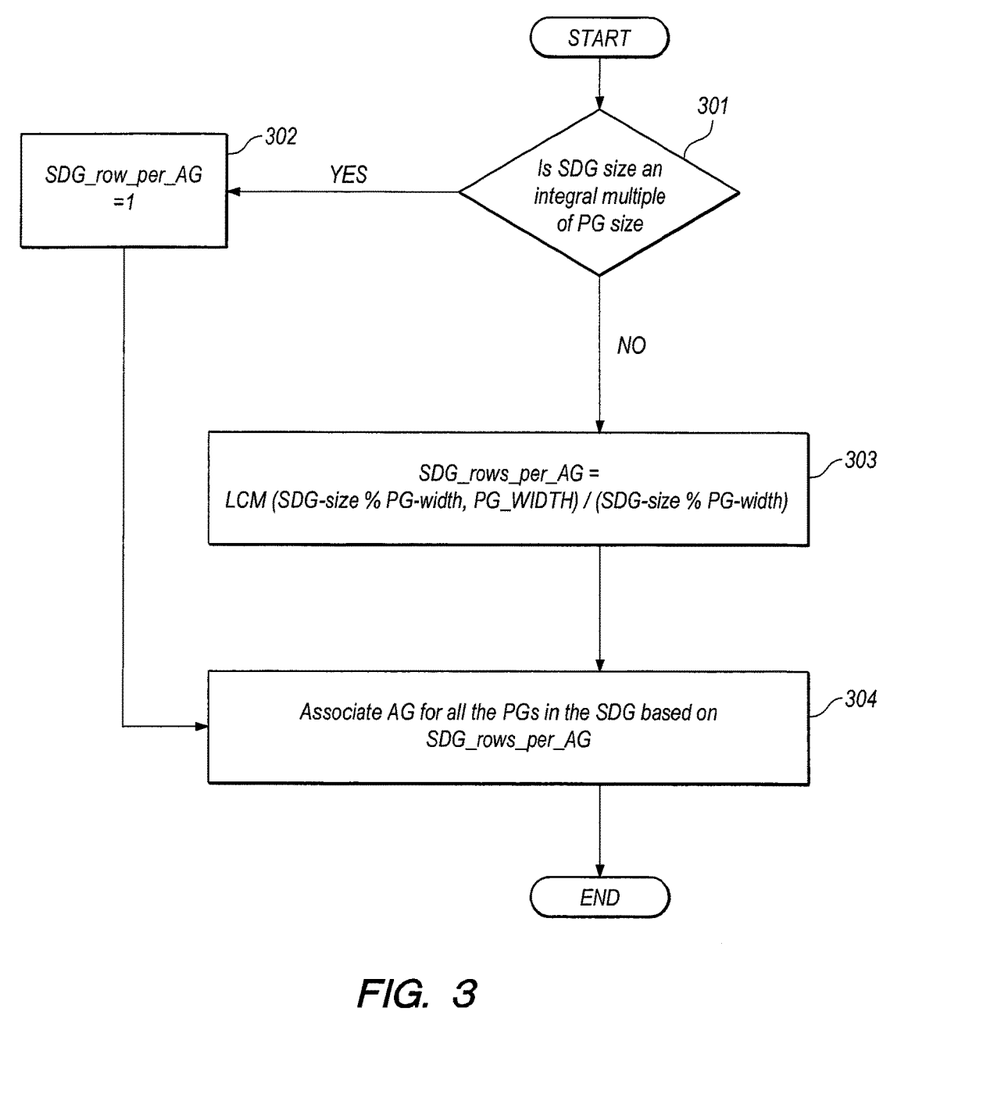
FIG. 3 is a flowchart depicting the allocation group creation process.

FIG. 3 is a flowchart depicting the allocation group creation process.

The process of creating allocation groups incorporates input of a sliced disk group which contains an array of parity groups which belongs to a given flexible aggregate, and output of an allocation group list which contains all the allocation groups for the SDG, the list of allocation groups for the SDG being created by associating every parity group with an allocation group.

Specifically, the allocation group creation process starts with deriving an SDG_rows_per_AG value. Slices are at same offset on each of the disk contained in a SDG forms one SDG-row. Write/read operation on a complete SDG-row will achieve uniform load distribution or uniform disk spindle utilization and maximum parallelization. Thus, an AG should try to span one or more SDG-rows in its entirety. At the same time AG should have integral number of PGs to avoid multiple parity computations.

Thus, to calculate the SDG_rows_per_AG value, first it is determined, in step 301, if SDG-size, which is the number of disks in the SDG, is an integral multiple of PG-width, which is the number of slices in a parity group. If an affirmative determination is achieved, then the SDG_rows_per_AG value is set to 1 in step 302. If, however, it is determined that the SDG-size is not an integral multiple of PG-width, then more than one SDG-row will be included in an AG to achieve even load distribution. The SDG_rows_per_AG value, in such a scenario, is calculated in step 303 using the following formula:

$$SDG\_rows\_per\_AG = LCM(SDG\text{-}size \% PG\text{-}width, PG\_width)/(SDG\text{-}size \% PG\text{-}width).$$

Following the above calculation of the SDG_rows_per_AG value, in step 304, we associate AG for all the PGs in the SDG based on the calculated SDG_rows_per_AG value, in-turn having one allocation group per 'x' rows where 'x' is equal to the calculated SDG_rows_per_AG value.

Figure 4:
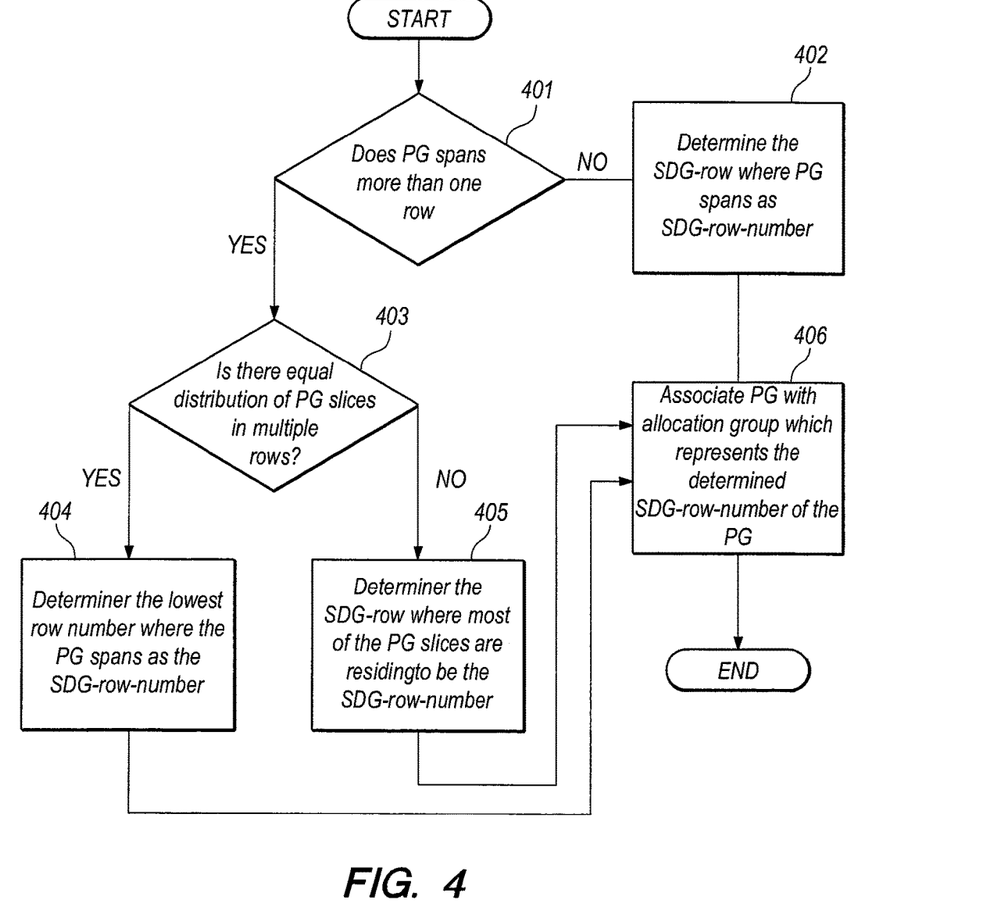
FIG. 4 is a flowchart depicting the association of AG for all the PGs in the SDG.

FIG. 4 is a flowchart depicting the association of AG for all the PGs in the SDG.

As shown in FIG. 4, steps 401-403, an SDG-row-number for a PG is determined. It is also possible that a PG is distributed in more than one SDG-row, as per a de-clustering requirement. Thus, in step 401, it is determined if a PG spans more than 1 row. If it does not, the SDG-row-number is determined, in step 402, to be the SDG-row where the PG spans. If, however, the PG spans more than 1 row, it is determined, in step 403, if there is equal distribution of PG slices in multiple rows. If so, the lowest row number where the PG spans is determined as the SDG-row-number in step 404. If however, the distribution of PG slices is not equal, the SDG-row where most of the PG slices are residing is determined to be the SDG-row-number, in step 405. Following this, the PG is associated with the allocation group which represents the determined SDG-row-number of the PG in step 406.

Thus, based on the above described steps depicted in FIG. 3 and FIG. 4, the allocation groups are created and associated.

Figure 5:
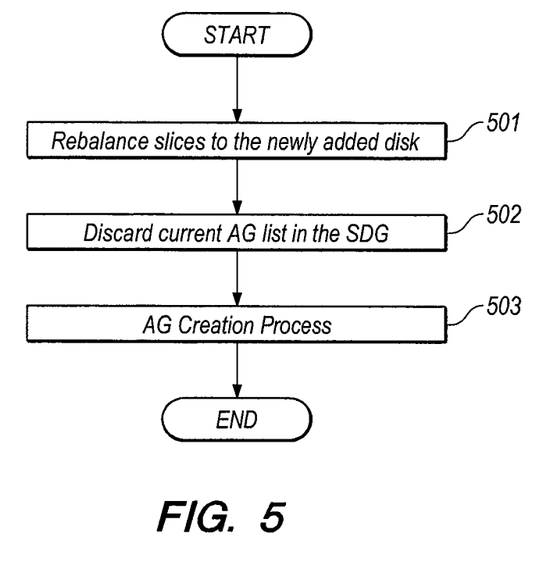
FIG. 5 is a flowchart depicting recreation of allocation groups after addition of a disk to a sliced disc group.

FIG. 5 is a flowchart depicting recreation of allocation groups after addition of a disk to a sliced disc group.

In step 501, rebalancing of slices to the newly added disk takes place. After the slices are rebalanced, the current AG list in the SDG is discarded in step 502. Following that, the AG creation process described in FIGS. 3 and 4 is performed again in step 503 to recreate the AG based on the rebalanced slices.

Figure 6:
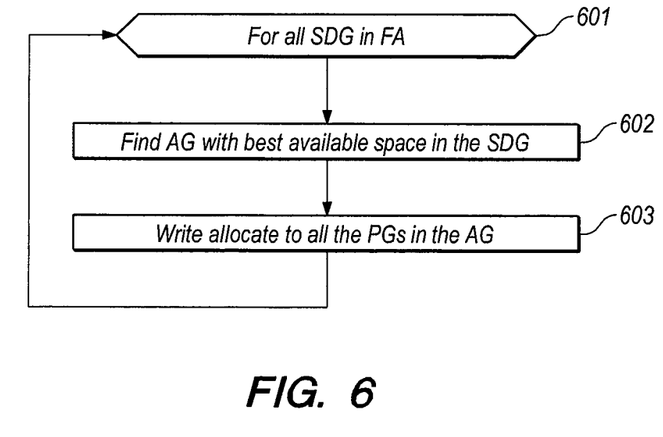
FIG. 6 is a flowchart depicting write allocation using allocation groups.

FIG. 6 is a flowchart depicting write allocation using allocation groups.

The process starts with a first SDG in flexible aggregate in step 601. In step 602, an AG is determined with the best available space in the selected SDG following which write allocation is performed to all the PGs in the determined AG in step 603. The above described steps are then repeated for all the SDGs in the flexible aggregate.

Allocation groups can also be used to schedule RAID operations like Parity Scrub which reads all slices in a PG and computes parity and compares it with parity slices, reports and fixes the parity inconsistencies if any. Associating this operation to run on allocation group basis, uniform disk utilization and maximum parallelization for read IOs can be achieved. This also helps in throttling the background operation by limiting the allocation groups participating in the scrub and limiting its impact on foreground IOs.

The approach of scheduling the operation on per allocation group basis may also be applicable for segment cleaning or defragmentation operations which clears fragmentation to create contiguous large free space in file system so that future writes will be efficient (i.e. to have full stripe write in future which doesn't involve additional reads or XOR computation) and large contiguous free space which can be tracked with less metadata in file system. Segment cleaning can make use of allocation group to clean all parity groups of an allocation group simultaneously and keep fragmentation level uniform across all parity groups so that future writes for this allocation group will achieve uniform disk utilization and maximizes the parallelization.

Allocation groups can also be used to achieve Quality of Service (QoS) within RAID layer. Priorities can be given to Allocation group for above described operations (Parity scrub, File system write allocation, and File system defragmentation) based on their QoS.

Figure 7:
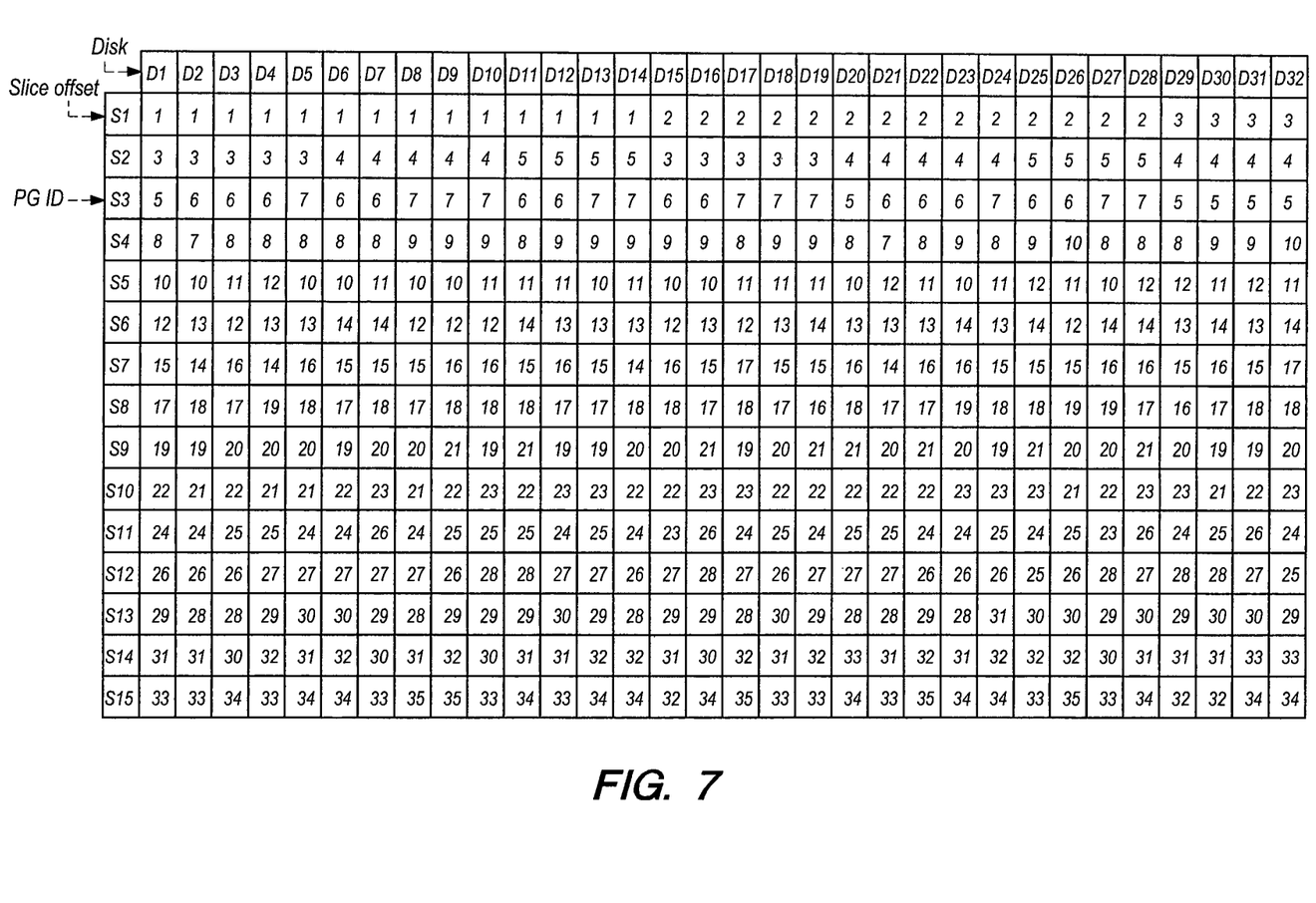
FIG. 7 depicts an uneven layout of parity groups, according to an exemplary embodiment.

IO throughput can also be provisioned using Allocation groups. FIG. 7 depicts an uneven layout of parity groups. Allocation Groups carved from outer diameter of disks in sliced disk group will have better read/write performance compared to middle diameter, and middle diameter is better compared to inner diameter. For example, flexible aggregate requiring higher JO throughput can be carved from Allocation Groups formed from outer diameter of disks.

Figure 8:
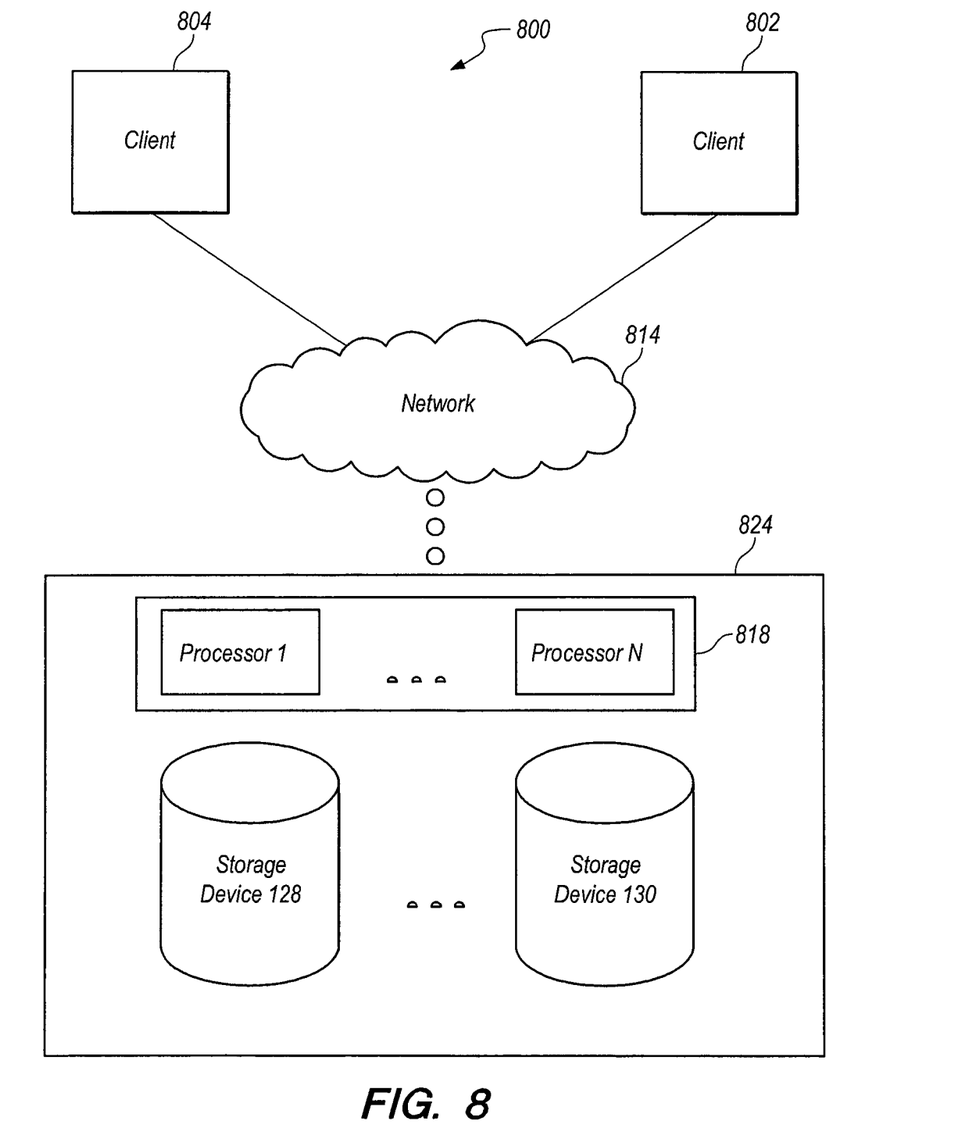
FIG. 8 depicts a block diagram of an example of a system comprising a storage server, in accordance with an exemplary embodiment.

FIG. 8 depicts a block diagram of an example of a system 800, in accordance with an exemplary embodiment of the present disclosure. The system 800 includes clients 802 and 804 and storage server 824. The clients, 802 and 804, may be computers or other processing systems capable of accessing the storage server 824 either directly or indirectly over a network 814. The clients, 802 and 804, may access the storage server 824 over the network 814 using wireless or wired connections supporting one or more point-to-point links, shared local area networks (LAN), wide area networks (WAN), or other access technologies. These clients 802 and 804 may be accessing data, applications, raw storage, or various combinations thereof stored on the storage server 824.

According to the exemplary embodiment depicted in FIG. 8, the system 800 is a type of storage system that provides storage services to clients 802 and 804 using, for example, storage area network (SAN), network-attached storage (NAS), or other storage technologies processed on multiple processors 818. However, it should be appreciated that alternate embodiments of the multiprocessor system 800 may deliver other types of computer services on a multiprocessor platform. For example, the storage server 824 may include web server technologies that deliver web pages and web services to the clients, 802 and 804, over the Internet. In other embodiments, the storage server 824 may include other general purpose applications that can deliver various functionalities or data to the clients, 802 and 804.

The storage server 824 is configured to operate according to a client/server model of information delivery thereby allowing multiple clients to access files or other data simultaneously. In this model, the client 802 or 804 may be a computer running an application, such as a file-system protocol. Each client, 802 and 804, may request the services of the storage server 824 by issuing storage-system protocol messages. For example, the clients, 802 and 804, can request to either read data from or write data to the storage server 824.

In the exemplary embodiment depicted in FIG. 8, the storage server 824 is a file-level server, such as a server used in a NAS environment, a block-level storage server used in a SAN environment, or other storage systems capable of providing both file-level and block-level service. For example, the storage server 824 may use a combination of software and hardware to provide storage services including the organization of information on storage devices 828 and 830, such as disks. The storage server 824 includes a file system to organize logically the information as a hierarchical or other structure of directories and files on the disks 828 and 830.

Although the storage server 824 is illustrated as a single unit in FIG. 8, it can also be implemented in a distributed architecture. For example, the storage server 824 can be implemented with multiple distributed storage servers (not shown). Additionally, the storage server 824 can also include a physically separate network module and disk module (not shown), which communicate with other storage servers over an external interconnect. The network module functions as a front-end of the storage server 824, exporting services to the clients, 802 and 804. The disk module functions as the back-end, managing and implementing a parity de-clustered distribution of a RAID organization on the underlying storage of the storage server 824.

In a system 800, the storage server 824 uses two or more processors, as represented by processors 818, which may also include multiple core processor designs. The processors 818 represent two or more computational units available in the storage server 824, may be a physical aggregation of multiple individual processors that each individually execute threads. Alternate implementations of processors 818 may be a single processor having multiple on-chip cores that may partition and share certain resources on the processor die such as the L1/L2 cache. Therefore, the term "processor," as used herein, could be applied to designs utilizing one core or multiple cores found on a single chip or die. Likewise, thread execution is used to describe the act of executing a set of related instructions on one or several processors. As used herein, a "thread" refers to a separate stream of execution that takes place simultaneously with and independently of other steams of execution. As an example, a thread can be a single sequence of instructions executed in parallel with other sequence of instructions, either by time slicing or multiprocessing. This allows a program to split itself into two or more simultaneously running tasks. Unlike processes, multiple threads can share state information of a single process, share memory, and other resources directly.

Figure 9:
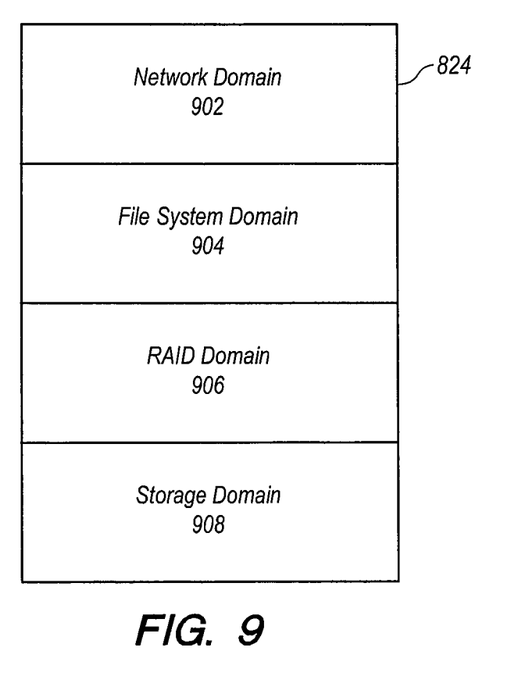
FIG. 9 depicts a block diagram illustrating examples of multiple domains within an exemplary embodiment of a storage server.

In accordance with embodiments of the present disclosure, the storage server 824 can be configured to adjust a number of threads for execution by the processors 818 based on monitoring utilizations of multiple domains. FIG. 9 depicts a block diagram illustrating examples of multiple domains, consistent with an embodiment. It should be appreciated that threads to be executed are divided into a set of domains according to their functionality and tasks they perform. Therefore, a "domain," as used herein, refers to a grouping of threads based on a common functionality. Accordingly, threads are scheduled according to their assigned domain, which allow for multiprocessor parallel execution, in accordance with an embodiment of the present disclosure. For example, as depicted in the exemplary embodiment of FIG. 9, a storage server may implement multiprocessing using the following set of domains: a network domain 902, file system domain 904, a RAID domain 906, and a storage domain 908. As implied by their names, the network domain 902 includes threads related to performing network specific functions. The file system domain 904 includes threads related to file system functions. The RAID domain 906 includes threads dealing with implementing the RAID functions and different levels of RAID (e.g., RAID-0 through RAID-5). The storage domain 908 includes threads directly related to operating storage devices.

The present disclosure is not limited to the precise construction and compositions disclosed herein; any and all modifications, changes, and variations apparent from the foregoing descriptions are within the spirit and scope of the disclosure as defined in the appended claims. Moreover, the present concepts expressly include any and all combinations and sub combinations of the preceding elements and aspects. An implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments. Accordingly, other implementations are within the scope of the following claims.

What is claimed:

1. A method for maximizing parallelization in a parity de-clustered and sliced disk Redundant Array of Independent Disks architecture implemented on at least one hard disk drive, using at least one processor, the method comprising:
creating, using the at least one processor, at least one allocation group, each created allocation group comprising at least one parity group within a sliced disk group;
selecting, using the at least one processor, one of said at least one created allocation group; and
performing, using the at least one processor, at least one of write or read concurrently on all parity groups within the selected allocation group, wherein
each of the at least one parity group comprises slices chosen from a subset of disks within the sliced disk group.

2. The method of claim 1, wherein
the sliced disk group comprises disks from the at least one hard disk drive incorporating similar properties,
the similar properties comprises at least one of RPM, size, checksum-style, media-type and operating protocol, and
the selecting is based on similarity of physical properties of the at least one parity group.

3. The method of claim 1, wherein the selecting is based on the available space in the sliced disk group.

4. The method of claim 1, wherein the creating further comprises:
determining, using at least one of said at least one processor, if size of the sliced disk group is an integral multiple of size of the parity group;
deriving, using the at least one processor, "SDG_rows_per_AG" value based on the determination; and
associating, using the at least one processor, each of the at least one allocation group for all parity groups in the sliced disk group based on the derived "SDG_rows_per_AG" value.

5. The method of claim 4, wherein if the determination is positive, the "SDG_rows_per_AG" value is set to 1.

6. The method of claim 4, wherein if the determination is negative, the "SDG_rows_per_AG" value is set using the formula:

SDG_rows_per_AG=Least Common Multiple(SDG-size % PG-width,PG_width)/(SDG-size % PG-width).

7. A non-transitory machine-readable medium having stored thereon instructions for performing a method which when executed by at least one processor, causes the processor to:
create at least one allocation group, each created allocation group comprising at least one parity group within a sliced disk group;
select one of said at least one allocation group; and
perform at least one of write or read concurrently on all parity groups within the selected allocation group, wherein
each of the at least one parity group comprises slices chosen from a subset of disks within the sliced disk group.

8. The non-transitory machine readable medium of claim 7, wherein the machine executable code further causes the machine to select the one of said at least one allocation group based on similarity of physical properties of the at least one parity group, wherein
the sliced disk group comprises disks from at least one hard disk drive incorporating similar properties, and
the similar properties comprises at least one of RPM, size, checksum-style, media-type and operating protocol.

9. The non-transitory machine readable medium of claim 7, wherein the machine executable code further causes the machine to select the one of said at least one allocation group based on the available space in the sliced disk group.

10. The non-transitory machine readable medium of claim 7, wherein the machine executable code causes the machine to create the at least one allocation group by further causing the machine to:
determine if size of the sliced disk group is an integral multiple of size of the parity group;
derive "SDG_rows_per_AG" value based on the determination; and
associate each of the at least one allocation group for all parity groups in the sliced disk group based on the derived "SDG_rows_per_AG" value.

11. The non-transitory machine readable medium of claim 10, wherein if the determination is positive, the "SDG_rows_per_AG" value is set to 1.

12. The non-transitory machine readable medium of claim 10, wherein if the determination is negative, the "SDG_rows_per_AG" value is set using the formula:

SDG_rows_per_AG=Least Common Multiple(SDG-size % PG-width,PG_width)/(SDG-size % PG-width).

13. A computing device, comprising:
a memory comprising machine executable code for performing a method of maximizing parallelization in a parity de-clustered and sliced disk Redundant Array of Independent Disks architecture implemented on the at least one hard disk drive;
a processor coupled to the memory, the processor configured to execute the machine executable code to cause the processor to:
create at least one allocation group, each created allocation group comprising at least one parity group within a sliced disk group;
select one of said at least one allocation group; and
perform at least one of write or read concurrently on all parity groups within the selected allocation group, wherein each of the at least one parity group comprises slices chosen from a subset of disks within the sliced disk group.

14. The computer device of claim 13, wherein the machine executable code further causes the processor to select the one of said at least one allocation group based on similarity of physical properties of the at least one parity group, wherein
the sliced disk group comprises disks from at least one hard disk drive incorporating similar properties, and
the similar properties comprises at least one of RPM, size, checksum-style, media-type and operating protocol.

15. The computer device of claim 13, wherein the machine executable code further causes the processor to select the one of said at least one allocation group based on the available space in the sliced disk group.

16. The computer device of claim 13, wherein the machine executable code causes the processor to create the at least one allocation group by further causing the processor to:
determine if size of the sliced disk group is an integral multiple of size of the parity group;
derive "SDG_rows_per_AG" value based on the determination; and
associate each of the at least one allocation group for all parity groups in the sliced disk group based on the derived "SDG_rows_per_AG" value.

17. The computer device of claim 16, wherein if the determination is positive, the "SDG_rows_per_AG" value is set to 1.

18. The computer device of claim 16, wherein if the determination is negative, the "SDG_rows_per_AG" value is set using the formula:

SDG_rows_per_AG=Least Common Multiple(SDG-size % PG-width,PG_width)/(SDG-size % PG-width).

* * * * *